US008780225B2

(12) United States Patent
Bai et al.

(10) Patent No.: US 8,780,225 B2
(45) Date of Patent: Jul. 15, 2014

(54) USE OF NOISE-OPTIMIZED SELECTION CRITERIA TO CALCULATE SCENE WHITE POINTS

(75) Inventors: Yingjun Bai, San Jose, CA (US); Xuemei Zhang, Mountain View, CA (US); David Kuo, San Jose, CA (US)

(73) Assignee: Apple Inc., Cupertino, CA (US)

( * ) Notice: Subject to any disclaimer, the term of this patent is extended or adjusted under 35 U.S.C. 154(b) by 247 days.

(21) Appl. No.: 13/348,192

(22) Filed: Jan. 11, 2012

(65) Prior Publication Data

US 2013/0093916 A1 Apr. 18, 2013

Related U.S. Application Data (60) Provisional application No. 61/546,146, filed on Oct. 12, 2011.

(51) Int. Cl.
*H04N 9/73* (2006.01)

(52) U.S. Cl.
USPC ........................................ 348/223.1

(58) Field of Classification Search
USPC ............................... 348/223.1, 241
See application file for complete search history.

(56) References Cited

U.S. PATENT DOCUMENTS

| 6,236,763 | B1* | 5/2001 | Wong et al. ............. 382/261 |
|---|---|---|---|
| 2003/0161545 | A1* | 8/2003 | Gallagher ............... 382/266 |
| 2003/0184659 | A1 | 10/2003 | Skow |
| 2004/0081363 | A1* | 4/2004 | Gindele et al. ........... 382/260 |
| 2005/0286097 | A1 | 12/2005 | Hung |
| 2006/0050783 | A1* | 3/2006 | Le Dinh et al. ........ 375/240.2 |
| 2006/0082665 | A1* | 4/2006 | Mizukura et al. ......... 348/272 |
| 2006/0290957 | A1 | 12/2006 | Kim |
| 2009/0087121 | A1* | 4/2009 | Han et al. ................ 382/266 |
| 2009/0129695 | A1 | 5/2009 | Aldrich |
| 2010/0220223 | A1* | 9/2010 | Tsuruoka ................ 348/242 |
| 2010/0309345 | A1 | 12/2010 | Zimmer |

FOREIGN PATENT DOCUMENTS

JP 2009164838 A 7/2009

OTHER PUBLICATIONS

Search Report and Written Opinion received in corresponding PCT Application No. PCT/US2012/055317, dated Jan. 2, 2013.
EP Search Report and Opinion for EP Appln. No. 12186561.2-1228, dated Jan. 9, 2013, 6 pages.
Dileepan J., et al. "Modeling, Calibration, and Correction of Nonlinear Illumination-Dependent Fixed Pattern Noise in Logarithmic CMOS Image Sensors," IEEE Transactions on Instrumentation and Measurement, 2002, vol. 51, No. 5, pp. 996-1001.

* cited by examiner

*Primary Examiner* — Aung S Moe
*Assistant Examiner* — Amy Hsu
(74) *Attorney, Agent, or Firm* — Wong, Cabello, Lutsch, Rutherford & Brucculeri, LLP (57) ABSTRACT

Methods, devices and computer readable media for implementing a "selective gray world" approach for color balancing are described. The disclosed techniques involve the use of noise-optimized selection criteria and, more specifically, in some embodiments, the interpolation between corresponding values in noise-optimized weighting tables when calculating white balance gains. Estimated scene lux levels may provide a valuable indicator of expected scene noise levels. The image processing techniques described herein may be executed by an image capture device or a general purpose processor (e.g., personal computer) executing a user-level software application. The described color balancing techniques may be implemented by dedicated or general purpose hardware, general application software, or a combination of software and hardware in a computer system.

22 Claims, 7 Drawing Sheets
(3 of 7 Drawing Sheet(s) Filed in Color)

USE OF NOISE-OPTIMIZED SELECTION CRITERIA TO CALCULATE SCENE WHITE POINTS

CROSS-REFERENCE TO RELATED APPLICATION

This application claims priority to U.S. Provisional Patent Application Ser. No. 61/546,146, filed Oct. 12, 2011, which is hereby incorporated by reference in its entirety.

BACKGROUND

This disclosure relates generally to the field of color balancing. More particularly, but not by way of limitation, it relates to techniques for improving the performance of auto white balance (AWB) algorithms by using noise-optimized selection criteria.

Color balancing may be thought of as the global adjustment of the intensities of the colors in an image. One goal of color balancing is to render specific colors, e.g., neutral white, as accurately as possible to the way the color appeared in the actual physical scene from which the image was captured. In the case of rendering neutral white colors correctly, the process is often referred to as "white balancing." Most digital cameras base their color balancing and color correction decisions at least in part on the type of scene illuminant. For example, the color of a white sheet of paper will appear differently under fluorescent lighting than it will in direct sunlight. The type of color correction to be performed may be specified manually by a user of the digital camera who knows the scene illuminant for the captured image, or may be set programmatically using one or more of a variety of AWB algorithms.

The "white point" of a scene can be estimated by evaluating an image or images captured by a camera image sensor that has a known response to a set of known light sources. Camera response to illuminants can be characterized by the following equation:

$$C_{white} = S*P \qquad \text{(Eqn. 1)}$$

where P stands for a set of spectral power distributions of the light sources, S is spectral sensitivity of the camera, and $C_{white}$ is the response vector of the camera. In other words, the camera's response will be a function of both the particular type of light source as well as the particular spectral response of the camera.

In real world imaging, the camera's response is also a function of the light reflected from object surfaces in the scene. This relationship can be described as:

$$C_{objects} = S*R*P, \qquad \text{(Eqn. 2)}$$

where R stands for the spectral reflectance of object surfaces.

The fundamental problem that AWB algorithms deal with is attempting to resolve the scene light source white point from the captured image caused by the unknown light source (P) with the known response and camera sensitivity (S), and with unknown object surfaces in the scene (R).

A variety of different methods have been investigated in both academia and in industry to resolve the uncertainty in estimating scene white point from image data only. The most basic "gray world" AWB algorithm makes a strong assumption about object surface reflectance distribution in the real world, i.e., that the color of the entire scene will average out to gray, in order to constrain the solution. Other published methods include: a version of Bayesian estimation that makes a less strong and more principled modeling of surface reflectance and illuminant distribution to arrive at better estimates; a "color by correlation" algorithm that makes use of the unique distribution of image chromaticity under different illuminants for its illuminant estimation; and even a class of algorithms that derive white point values from specular or micro-specular reflectance information in the scene.

In industrial practice, however, the most prevalent white balance methods are still those based loosely on a modified gray world method, due to their ease of implementation and decent stability. There can be many variations of such an approach, but most involve first selecting a subset of the pixel responses that are likely to be from neutral surfaces illuminated by plausible light sources, and then making the assumption that the average chromaticity of such pixels is likely to represent the color of true white/gray in the scene. This class of methods will be referred to herein as "selective gray world" algorithms.

The biggest limitation with such a selective gray world method is the same one that makes the original gray world method unpractical, namely, the assumption that "likely gray" pixel responses actually do average out to gray. From modeling camera responses to typical object surface reflectances under common illuminants, it has been determined that this assumption is often violated. For instance, depending on the illuminant and surface distribution of each usage scenario, some "likely gray" pixel responses are more likely to be gray than others, i.e., some pixel responses carry more information about the true white point than others. A weighting scheme can be used to treat these pixel responses differently in order to improve white point estimation accuracy. Once the subset of "likely gray" pixels of the captured image are selected, the white point of the scene can be calculated as the weighted sum of these pixel values:

$$r = \text{sum}(R*W)/\text{sum}(W);$$

$$g = \text{sum}(G*W)/\text{sum}(W); \qquad \text{(Eqns. 3)}$$

$$b = \text{sum}(B*W)/\text{sum}(W),$$

where W refers to weight vector, and R, G, B are pixel color vectors.

Only two channels need to be adjusted to get the image white balance, which are usually r and b channels:

$$R' = (g/r)R; \qquad \text{(Eqns. 4)}$$

$$B' = (g/b)B;$$

where R and R' are red channel response before and after white balance adjustment, and B and B' are blue channel response before and after white balance adjustment.

Accordingly, there is a need for techniques to provide more accurate white balancing in images using an improved "selective gray world" approach. By intelligently weighting the plausible neutral pixel values when calculating white balance gains, white points can be calculated more accurately.

SUMMARY

This disclosure pertains to devices and computer readable media for implementing a more effective "selective gray world" approach for color balancing. The techniques described herein involve the use of noise-optimized selection criteria and, more specifically, in some embodiments, interpolation between noise-optimized weighting look up tables (i.e., "weighting tables") when calculating white balance gains. Estimated scene lux levels may provide a valuable indicator of expected scene noise levels. The camera image processing techniques described herein may be executed by an image capture device or in a general PC software application format. The color balancing techniques described herein may be implemented by dedicated or general-purpose hardware, general application software, or a combination of software and hardware in a computer system.

As described in the Background section, a key aim of AWB algorithms is to identify the plausible "white" pixels in the captured image in order to calculate the scene white point and then create a sensible statistic for those selected pixel values that provides a more accurate estimate of the scene white point.

In addition to variations in the composition of a scene, the "probability of a pixel being gray" is also affected by sensor characteristics, especially the spectral sensitivity and noise properties of the sensor. For example, when sensor noise level is high under low light conditions, a pixel response that would be unlikely to be from a gray surface under brighter lighting, may very well become a good contributor to white point statistics under the low light conditions. One aim of the techniques described herein is to model these variations based on estimated sensor noise level in order to generate a set of pixel statistics in a principled way that provides an actual estimator of white point, rather than taking the leap of faith in assuming that the average of "likely gray" pixels actually corresponds to true gray.

One aspect of this disclosure proposes a series of white pixel selection criteria based on the noise characteristics of the image over a wide range of image capture conditions, These so-called "noise optimized" selection criteria may be embodied in multiple forms, e.g., through formulae, via a binary selection criteria (i.e., a pixel is either "considered" or "not considered"), or via a look up table (e.g., embodied in the form of a weighting table that may be visualized as a weighting mask in some embodiments), or any other applicable forms. These criteria may be formulated based on modeling camera responses to different illuminants and the noise characteristics of a particular imaging sensor. The set of white point selection criteria may be pre-calculated for each camera image sensor and stored in the image capture device itself or in application software format. In field use, the specific noise level of each captured image may be estimated from image capture parameters such as exposure duration and sensor gains, which are then used to determine which set(s) of white point selection criteria to use from among the multiple sets stored in the device or application software.

Thus, in one embodiment described herein, a non-transitory program storage device, readable by a programmable control device, is disclosed, comprising instructions stored thereon for causing the programmable control device to: store image pixel data in a memory, wherein the image pixel data is obtained from an image captured by an image sensor; transform the image pixel data into a set of image pixel values over a color space; estimate a noise level for the image; identify, based at least in part on the estimated noise level, a noise-optimized weighting table of values, wherein each value in the noise-optimized weighting table has a corresponding image pixel value; multiply each image pixel value with its corresponding noise-optimized weighting table value to generate noise-weighted image pixel data; and store the noise-weighted image pixel data in the memory.

In another embodiment described herein, a non-transitory program storage device, readable by a programmable control device, is disclosed, comprising instructions stored thereon for causing the programmable control device to: store mage pixel data in a memory, wherein the image pixel data is obtained from an image captured by an image sensor; estimate a noise property of the image; identify, based at least in part on the estimated noise property, a noise-optimized pixel selection criteria; apply the noise-optimized pixel selection criteria to the image pixel data to generate weighted image pixel data; and store the weighted image pixel data in the memory.

In yet another embodiment described herein, a non-transitory program storage device, readable by a programmable control device, is disclosed, comprising instructions stored thereon for causing the programmable control device to: store image pixel data in a memory, wherein the image pixel data is obtained from an image captured by an image sensor; estimate a lux level of the image; identify, based at least in part on the estimated lux level, a noise-optimized weighting table by interpolating between corresponding values in a plurality of pre-stored noise-optimized weighting tables; apply the noise-optimized weighting table to the image pixel data to generate noise-weighted image pixel data; and use the noise-weighted image pixel data to calculate a white point for the image pixel data.

Novel and improved techniques for AWB in accordance with the various embodiments described herein are readily applicable to any number of electronic image capture devices with appropriate image sensors, such as mobile phones, personal data assistants (PDAs), portable music players, digital cameras, as well as laptop and tablet computer systems.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Methods, devices and computer readable media for implementing a "selective gray world" approach for color balancing are described. The disclosed techniques involve the use of noise-optimized selection criteria and, more specifically, in some embodiments, the interpolation between corresponding values in noise-optimized weighting tables when calculating white balance gains. Estimated scene lux levels may provide a valuable indicator of expected scene noise levels. The image processing techniques described herein may be executed by an image capture device or a general purpose processor (e.g., personal computer) executing a user-level software application. The described color balancing techniques may be implemented by dedicated or general purpose hardware, general application software, or a combination of software and hardware in a computer system.

In the interest of clarity, not all features of an actual implementation are described in this specification. It will of course be appreciated that in the development of any such actual implementation (as in any development project), numerous decisions must be made to achieve the developers' specific goals (e.g., compliance with system-and business-related constraints), and that these goals will vary from one implementation to another. It will be further appreciated that such development effort might be complex and time-consuming, but would nevertheless be a routine undertaking for those of ordinary skill having the benefit of this disclosure.

In the following description, for purposes of explanation, numerous specific details are set forth in order to provide a thorough understanding of the inventive concept. As part of the description, some structures and devices may be shown in block diagram form in order to avoid obscuring the invention. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Figure 1A:
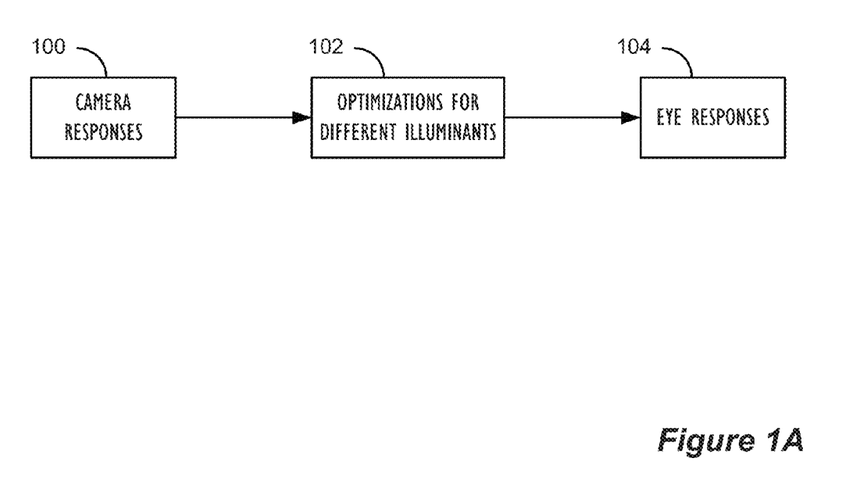
FIG. 1A illustrates a perceptual model for correcting camera response to the sensitivity of the human eye.

Turning first to FIG. 1A, a perceptual model for correcting camera response to the sensitivity of the human eye is shown for explanatory purposes. At basic level, a camera's image sensor will have characteristic responses 100 to incident light across the entire spectrum of wavelengths to which the image sensor is sensitive. The scene being captured may also be lit by different types of illuminants, which can have an effect on the way that the colors in the scene will be reproduced and perceived by the human eye. Thus, different optimizations 102, such as color balancing, may be employed based on different illuminant types.

If the image sensor's sensitivity is the same as the sensitivity of the human eye across the visible ranges of the human eye, then no further color correction beyond color balancing may be needed; however, if the image sensor's sensitivity and the sensitivity of the human eye are different across the particular range of human vision, then further color correction, such as the application of a color correction matrix (CCM) may also be employed to the image sensor captured data to ensure the perception of the color by the human eye 104 is as accurate as possible to the real-world scene color.

Figure 1B:
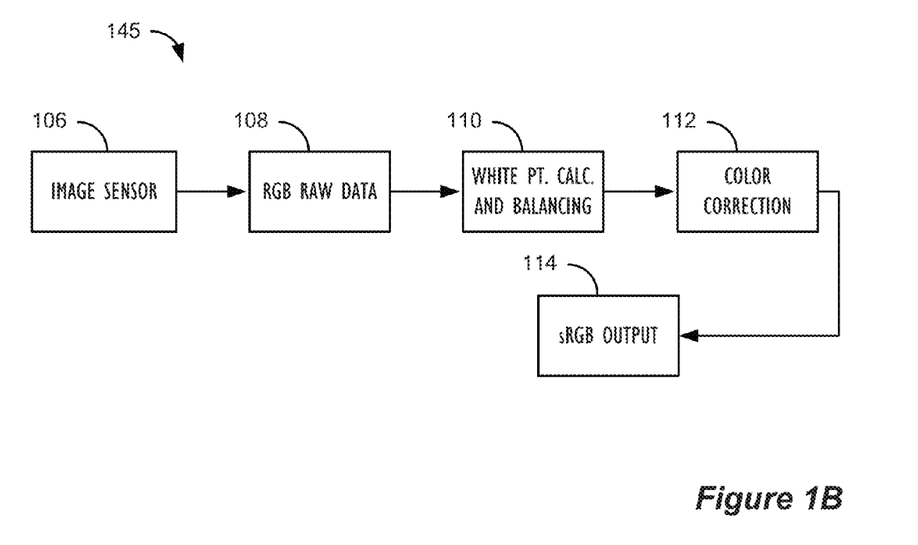
FIG. 1B illustrates an abstractive and conceptual image processing pipeline for performing color correction.

Turning now to FIG. 1B, an abstractive and conceptual image processing pipeline 145 for performing color correction is shown for explanatory purposes. First, the scene is captured by an image sensor 106. Data is output from the image sensor in RGB raw data format 108. Next, scene white point is calculated and a white balance algorithm is run over the captured image sensor data 110 to determine if the gains of any of the R, G, or B channels need to be adjusted so that a white pixel renders as white. Any of a number of possible white balance algorithms may be used, such a gray world algorithm, selective gray world algorithm, or weighted accumulator algorithm. Next, depending on the type of illuminant, further color correction 112, for example, a CCM, may be applied to the image data. The values in a CCM may be a function of both the scene white point and the scene lux level. Therefore, two images with the same white point could have very different CCMs. Once the image data has been color balanced and color corrected as desired, output data, e.g., in the form of sRGB (i.e., standard RGB), may be sent to a desired display device 114.

With this framework in mind, the remainder of the Detailed Description will discuss techniques that may be used and applied to the raw pixel data coming out of element 108 so that the white point calculation and color balance process 110 will be more effective. Specifically, the techniques discussed herein will relate to image processing techniques for creating and interpolating noise-optimized selection criteria, e.g., via the use of weighting tables.

Figure 2:
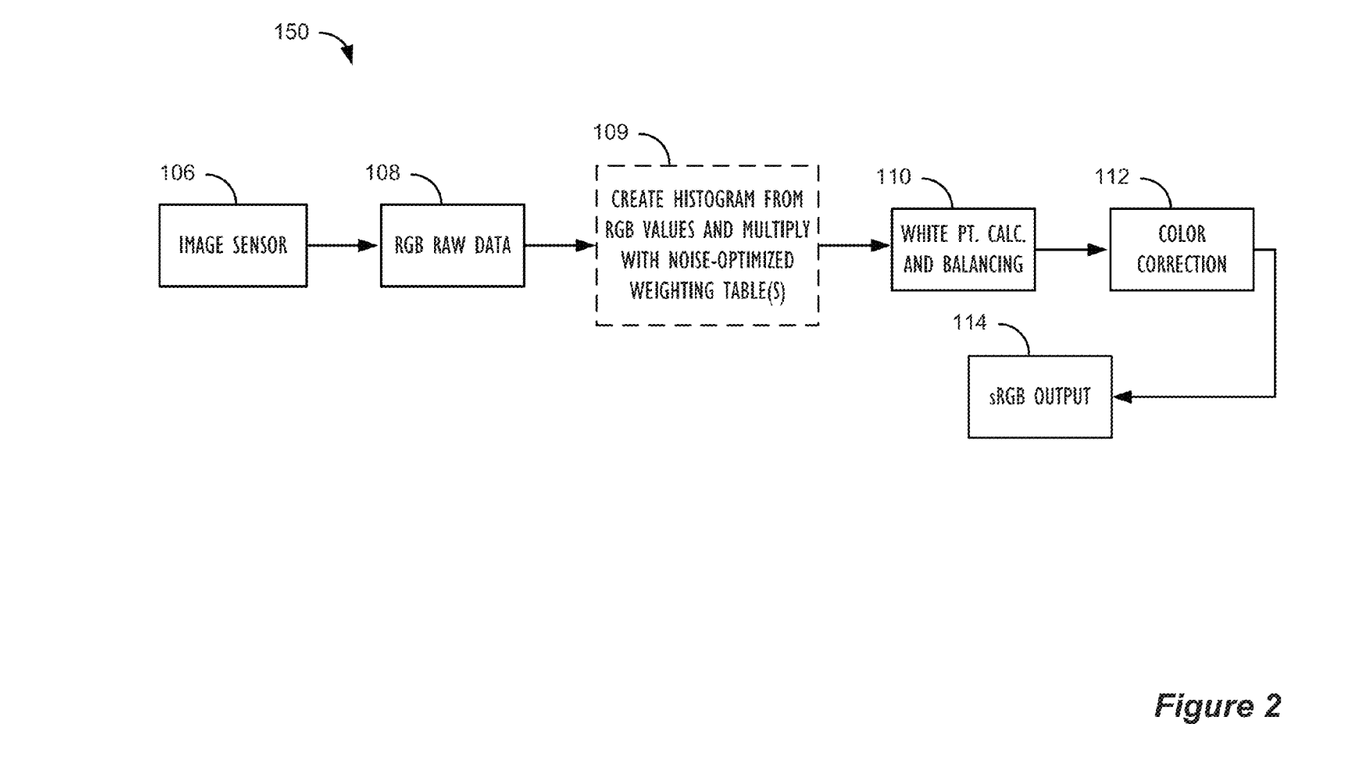
FIG. 2 illustrates an improved image processing pipeline for performing color balancing and correction utilizing noise-optimized weighting tables, in accordance with one embodiment.

Turning now to FIG. 2, an improved image processing pipeline 150 for performing color correction utilizing noise-optimized weighting tables is shown, accordance with one embodiment. Compared to image processing pipeline 145 shown in FIG. 1B, the improved image processing pipeline 150 has an element 109 labeled "Create Histogram from RGB values and Multiply with Noise-Optimized Weighting Table(s)" between the receiving of raw data at element 108 and the performance of white point calculation and color balancing at element 110, The transformations of raw pixel data via the use of noise-optimized weight table(s) 109 will now be described in further detail below.

According to some embodiments, the color space, or "chromaticity space," in which the image pixel data histogram is accumulated may be defined by a series of mathematical transformations in order to give the space a particular shape or to result in other desired properties being enforced. Additionally, the transformation parameters may be optimized to adapt to specific sensors' spectral sensitivity. In the example described below, the chromaticity space will be a color ratio space. Any desired color space may be used, such a straight color ratio space (e.g., R/G by B/G).

Constructing the "Noise-Optimized Weighting Table"

Figure 3:
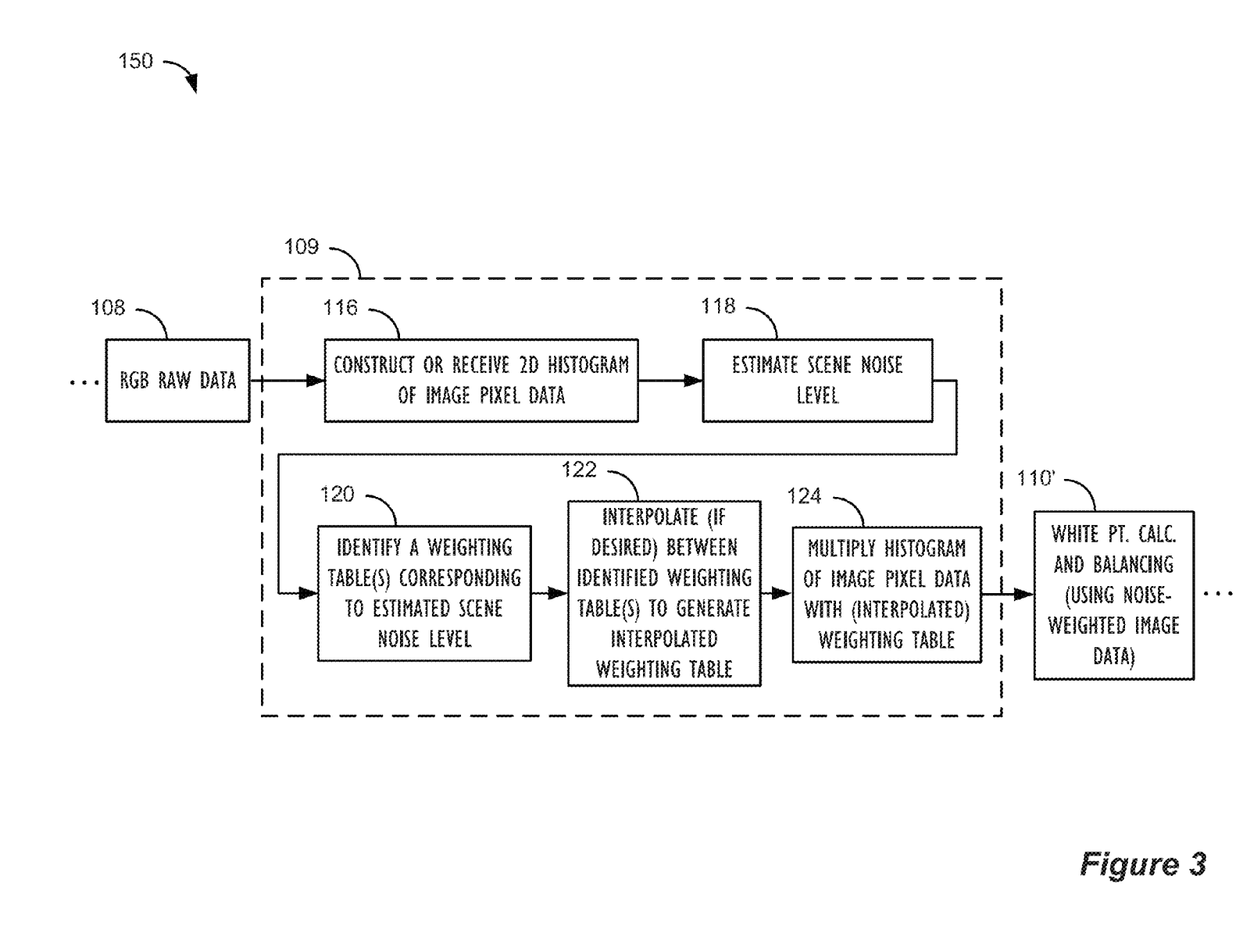
FIG. 3 illustrates, in greater detail, a process for creating noise-optimized weighting tables, in accordance with one embodiment.

As mentioned above, it rage sensor information may come into the image processing pipeline 150 from the image sensor n the form of RGB raw data, i.e., COLan unprocessed linear RGB signal that is not ready for display. Turning now to FIG. 3, the process flow 109 for creating a "noise-optimized weighting table(s)" to be applied to the image pixel data is shown in greater detail.

In order to reduce the input signal from three color dimensions (i.e., red, green, and blue) into two color dimensions, the RGB signal may be converted into chrominance values. Chrominance, as used herein, will refer to an objective specification of the quality of a color—independent of its luminance (i.e., brightness). Once luminance has been removed from consideration, the remaining components of a color can be defined by two variables, sometimes referred to as x and y. This is useful, as it allows the chromaticity space to be mapped into a 2D plot where all existing colors may be uniquely identified by an x-y coordinate position in the chromaticity space. These chrominance values may then be accumulated in a 2D histogram created over the color space (Element 116). The histogram of color values may either be received at the process flow 109 (i.e., constructed by some external process) or may be constructed within process flow 109.

Next, the process flow 109 may attempt to estimate the scene noise level (Element 118). As mentioned above, estimated scene noise level may prove valuable in constructing an appropriate weighting table. Various capture conditions may influence the noise level of the image, including: sensor full well capacity, sensor read noise, sensor analog gain, scene lux level, and sensor quantization, etc. Next, the process flow 109 may identify a weighting table or tables corresponding to the estimated scene noise level (Element 120). In some embodiments, representative weighting tables may be stored, wherein each representative weighting table corresponds to a particular one of a plurality of predetermined lux levels. Then, once the scene lux level has been estimated for a given image, the process 109 may interpolate between corresponding values in the stored representative weighting tables most closely corresponding to the estimated scene lux level in order to generate an interpolated weighting table that is customized to the estimated scene lux (and, thus, noise) level of the given image (Element 122). In some such embodiments, each value in the noise-weighted tables may be used in the interpolation calculation, though the use of each value in the table is not strictly necessary. In still other embodiments, if sufficient storage space and processing power is available, Elements 120 and 122 may be replaced by the single step of analytically calculating a weighting table "on the fly" based on the estimated scene noise level, rather than interpolating between pre-stored weighting tables. Finally, the image data, e.g., in the form of a 2D image histogram, may then by multiplied by the corresponding values in the noise-weighted table to generate a set of noise-weighted image pixel data, i.e., a set of weighted values likely to produce a ore accurate white point calculation for the scene for the given sensor and estimated noise level (Element 124). The noise-weighted image pixel data may then by passed to a desired AWB algorithm 110' for the calculation of the scene white point by any desired method. In some embodiments, the AWB algorithm 110' may simply comprise an algorithm that assumes the remaining noise-weighted image pixel data averages out to gray, i.e., a "selective gray world" approach. In other embodiments, more complex AWB algorithms may be employed, as discussed above.

In some embodiments, an image noise sensor model may be used to generate representative weighting tables, wherein each representative weighting table corresponds to a particular noise level. According to one embodiment, an exemplary image sensor noise model can be expressed as follows:

$$Vn=(C/K*Ga+V1*Ga2+V2)*K2, \quad (Eqn. 5)$$

where Vn is the noise variance associated with a particular pixel response C, K is the conversion gain of the sensor, Ga is the analog gain at capture, and V1 and V2 are the variances for gain-independent noise sources (kT/C, source follower, amplifier input noise) and gain-dependent noise sources (electronic and quantization noise), respectively.

Given the noise model in Eqn. 5 above, and assuming additive noise nature, the camera response to illuminants can be expressed as follows:

$$C=S*P+n, \quad (Eqn. 6)$$

where n is a noise vector and S and P are as described above in the Background section.

Assuming a (much simplified) normal distribution N[0, Vn] for the noise term n, then, from Eqn. 1 above, the distribution of a particular pixel response, C, may be expressed as: N[S*P, Vn]. The likelihood of getting a particular camera response, given a particular illuminant, P, may then be easily calculated this way. Using the above equations for determining the probability of a given pixel's response given a particular illuminant, the values of the various representative weighting table corresponding to a particular noise level may be generated.

To get a more accurate white point estimate from camera response data, a probability distribution of white points given camera responses and estimated noise level may be used, i.e., D(P|C, n). This probability distribution, D, can be calculated by compiling the likelihood of camera responses, i.e., L(C|P, R, n), for each illuminant at different light levels and with different scene surface compositions, using the camera and noise model described above, resulting in a probability distribution, D, that may be expressed as follows:

$$D(P|C, n)=L(C|P, R, n)*D(P, R)/D(C) \quad (Eqn. 7)$$

Once the relative probability of each white point is modeled this way, a pixel selection and weight criteria may be formed using a variety of possible statistics. As one example, a linear weighted sum of all ca era responses, C, may be used to estimate the white point, where the weights are forced to zero for camera responses with D(P|C, n) below a certain threshold, and other non-zero weights are calculated to reflect their relative likelihood of a pixel being a white surface, given object surface reflectance distribution in the real world.

Figure 4:
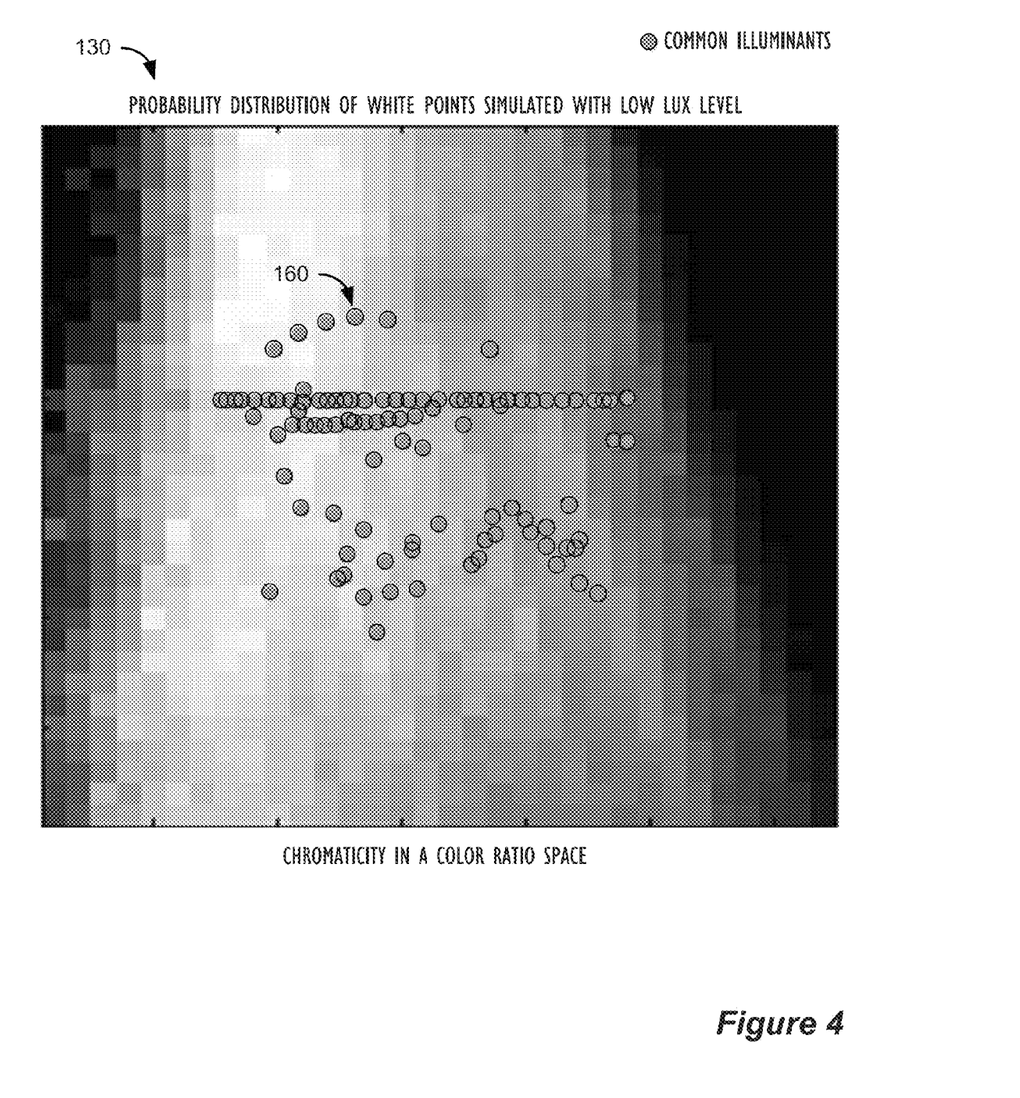
FIG. 4 illustrates an exemplary low lux level noise-optimized weighting table in mask form, along with common illuminant white points, in a color ratio chromaticity space, in accordance with one embodiment.
Figure 5:
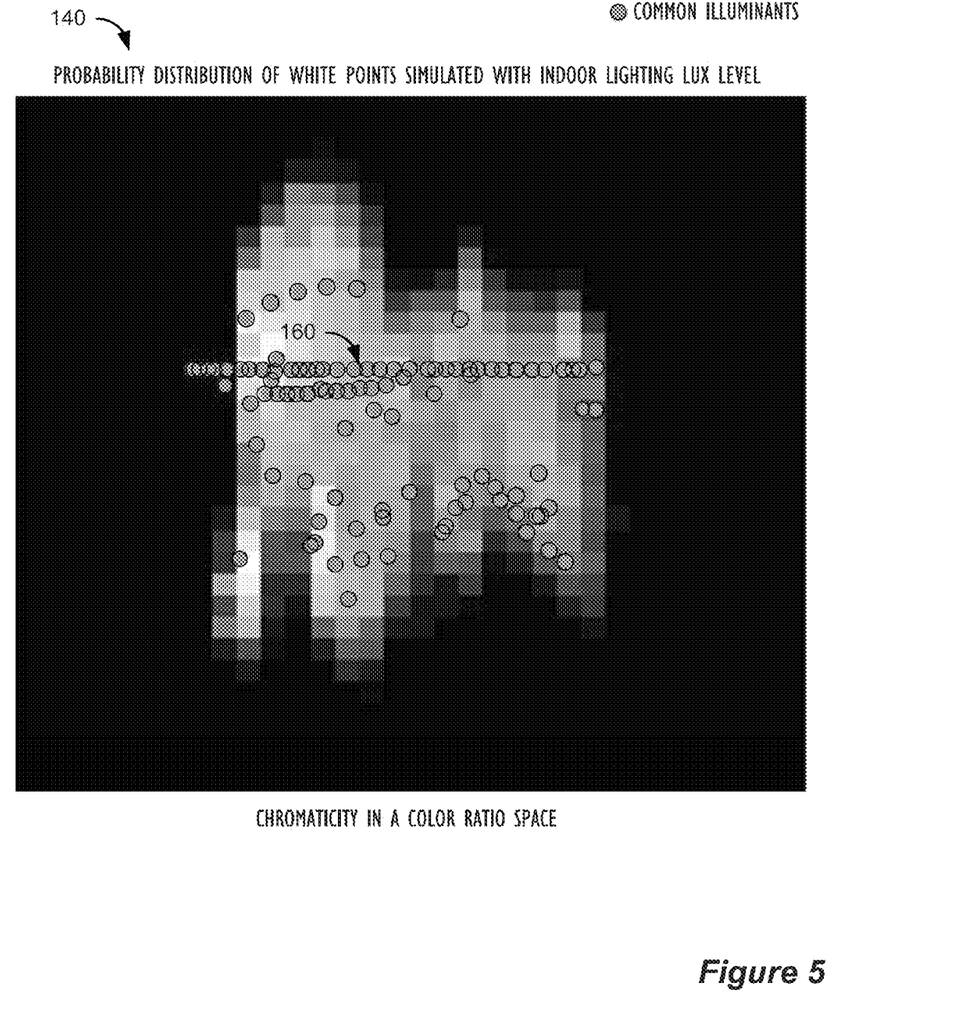
FIG. 5 illustrates an exemplary indoor lux level noise-optimized weighting table in mask form, along with common illuminant white points, in a color ratio chromaticity space, in accordance with one embodiment.

From the equations above, it may be seen that the probability distribution of white points under different noise level can be very different from each other, due to, e.g., differences in the noise distribution, N[0, Vn]. FIGS. 4 and 5 show the probability distribution of white points calculated according to the methods described above under two different scene lux levels, i.e., a very low lux level and an indoor lighting lux level, respectively. Brighter colors in the histogram correspond to a greater likelihood that a given pixel falling at that location in the chromaticity space corresponds to a white surface, whereas darker colors in the histogram correspond to a smaller likelihood that a given pixel falling at that location in the chromaticity space corresponds to a white surface. Based on the differences between the two distributions shown in FIGS. 4 and 5, it may be inferred that different selection criteria should be used for selecting pixels to include in the AWB calculation at different noise levels, and that different statistics should be used to combine these pixel values into a white point estimate.

Turning now to FIG. 4, an exemplary very low lux noise-optimized weighting table 130 is illustrated as a mask, along with common illuminant white points 160, in a color ratio chromaticity space. For reference, average indoor lighting ranges from 100 to 1,000 lux, and average outdoor sunlight is about 50,000 lux. As described above, by estimating scene lux, a set likely lighting sources type can be inferred, and then the range of known possible white values for such a light source, i.e., the non-black areas in FIG. 4, may be inferred. For example, at low lux levels, the non-black areas in the mask will need to be relatively large, as the set of likely lighting sources is larger, and, at very high lux levels, the range of known possible white values may be relatively smaller, e.g., confined closely to the daylight white point area. As illustrated in FIG. 4, at very low lux levels, the probability distribution over almost the entire exemplary chromaticity space could be non-black (i.e., a pixel at any non-black location has at least some probability that a pixel occurring at such a location may be from a white surface, with brighter colors corresponding to higher weighting values being stored at the corresponding locations in the weighting table). This reflects the fact that there are large amounts of noise anticipated at low lux levels, and thus it is hard to discard any pixels (or at least entirely discard any pixels) from the calculation of the scene white point at such low lighting levels.

FIG. 5 illustrates an exemplary regular indoor lighting lux noise-optimized weighting table 140 in mask form, along with common illuminant white points 160, in the chromaticity space shown in FIG. 4. Compared to FIG. 4, the probability distribution at the lux level shown in FIG. 5 is black over a much larger portion of the chromaticity space. In FIG. 5, the non-black areas of the probability distribution are more tightly confined to the zone where common illuminant white points 160 are found. This reflects the fact that, even at regular indoor lighting levels, there is less anticipated noise, and thus pixels not located within or near to the common illuminant range may more safely be discarded or at least largely discounted (i.e., given a lower weight) in the calculation of the scene white point.

As another example to more intuitively illustrate the need for using multiple selection criteria that are conditional on estimated noise level, suppose the AWB algorithm works in [R/G, B/G] device color ratio space, and the white pixel selection criteria are described by the following two equations under low noise capture condition, such as daylight.

$$Th1<R/G<Th2$$

$$Th3<B/G<Th4 \quad \text{(Eqns. 8)}$$

Due to the noise-introduced uncertainty, for a high noise captures, i.e., images captured under low light, such as outdoor n the evening, the criteria to pick the white pixel can simply be the above criteria expressed in Eqns. 8 with a wider tolerance, $\Delta$, that is calculated through noise model of the imaging sensor, For example:

$$Th1-\Delta1<R/G<Th2+\Delta2$$

$$Th3-\Delta3<B/G<Th4+\Delta4 \quad \text{(Eqns. 9)}$$

The additional tolerances, $\Delta1$ to $\Delta4$, reflect the fact that noise of the pixel values introduced additional uncertainty to the likelihood of a pixel being a white pixel, so more pixels will be counted toward calculating the white point of the scene when noise is higher.

In the above illustrative example, if the linear weight sum model used to calculate the final white point, and if unity weight is given to all pixels selected through the above criteria, then the white point of the higher noise (i.e., low light) scene would be:

$$r=\text{sum}(R+\Delta R)/(n+\Delta n);$$

$$g=\text{sum}(G+\Delta G)/(n+\Delta n); \quad \text{(Eqns. 10)}$$

$$b=\text{sum}(B+\Delta B)/(n+\Delta n).$$

wherein $\Delta R$, $\Delta G$, $\Delta B$ are vectors representing additional pixels going into the calculation, and n and $\Delta n$ represent the original number of pixels going into the calculation and the additional number pixels going into the calculation in the high noise scenario, respectively.

Thus, it may be seen that taking into account the noise change in the captured image would result in a more statistically accurate and stable solution than an AWB solution that does not adaptively adjust the white pixel selection criteria accordingly when the image noise level changes.

As mentioned above, due to limitations inherent in some implementations, it may not be possible to analytically calculate the neutral pixel selection criteria for every possible estimated noise level. In such situations, there may only be a limited selection of stored neutral pixel selecting criteria. These criteria may, e.g., correspond to sparsely sampled noise levels or lux levels that are likely to exist in environments where the image capture device is used in the real world. In such cases, the noise correlated pixel selection criteria may not based on analytic formula—even though, in reality, the noise behavior is a continuous process. In these cases, for any noise level that falls in between the sparsely sampled noise levels, an interpolation between the stored selection criteria may be used to calculate the corresponding white pixel selection criteria for the noise level.

For example, the selection criteria may exist in numerical form, such as a look up table (LUT) array, with each LUT element corresponding to noise level vector, N. For an input image of noise level, n, the white pixel selection criteria could be linearly interpolated between two LUT elements corresponding to two adjacent sampled noise levels, e.g., $N_{i-1}$ and $N_i$, if n is between these two noise levels. If image noise, n, is smaller than the smallest sampled noise level, then the pixel selection criteria of smallest noise level could be used. The same could apply to an estimated noise level that is larger than the largest sampled nose level, i.e., the pixel selection criteria of largest noise level could be used.

Figure 6:
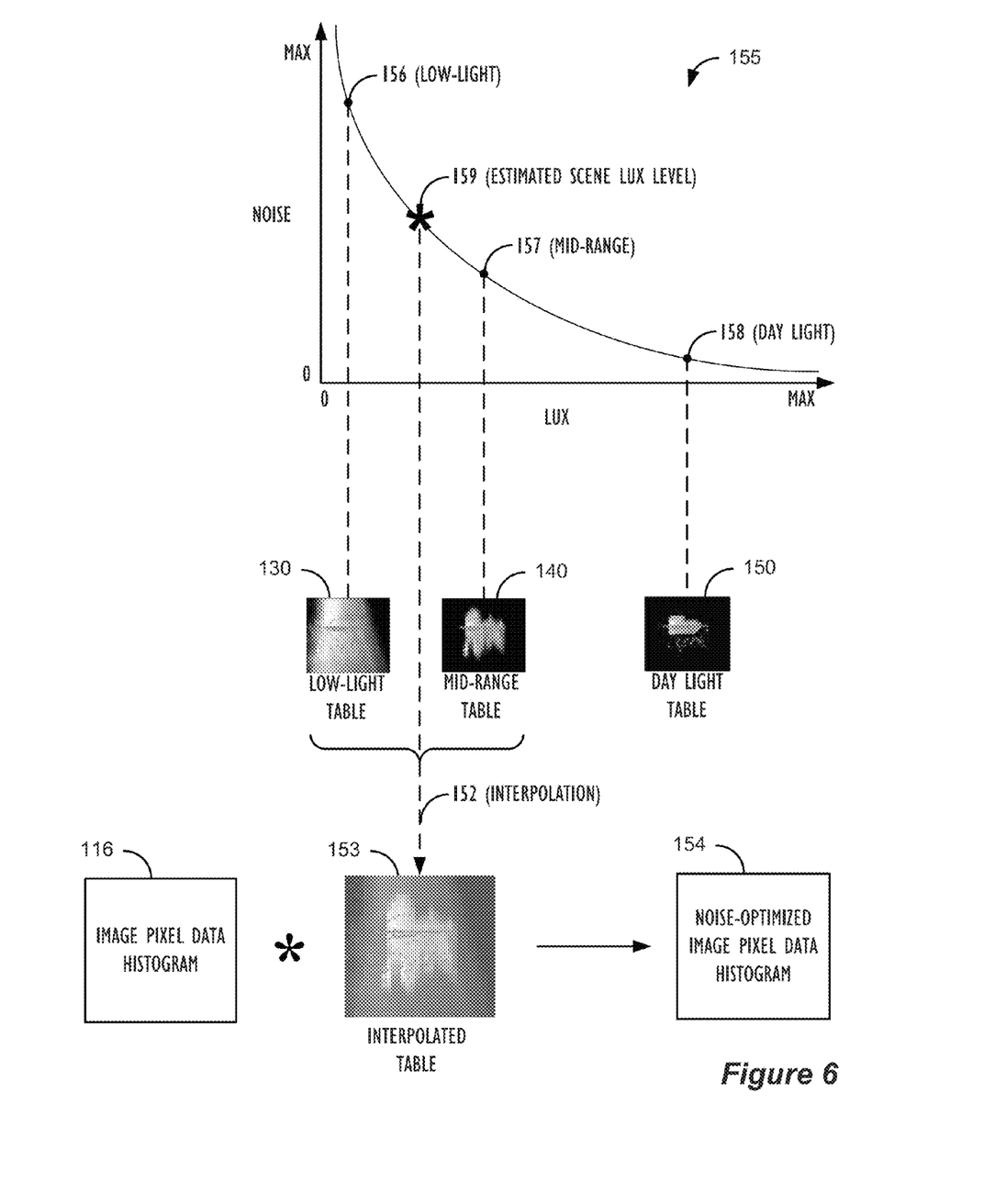
FIG. 6 illustrates a process for creating an interpolated noise-optimized weighting table, in accordance with one embodiment.

Turning now to FIG. 6, a process for creating an interpolated noise-optimized weighting table 153 is illustrated in greater detail, in accordance with one embodiment. Plot 155 represents an exemplary relationship between estimated scene lux across the horizontal axis of the plot and estimated noise across the vertical axis of the plot. As shown in plot 155, as estimated scene lux increases, the estimated noise level decreases in an essentially asymptotic manner. For instance, low-light condition 156 corresponds to pre-stored low-light weighting table 130 (see FIG. 4), and mid-range light condition 157 corresponds to pre-stored mid-range weighting table 140 (see FIG. 5). Further to the right on the horizontal axis, day-light condition 158 corresponds to pre-stored day-light weighting table 150. Notice that the non-black areas in day-light weighting table 150 are even more tightly confined to the common illuminant range corresponding to daylight. In the illustrative embodiment of FIG. 6, there are three pre-stored weighting tables shown, but in other embodiments, there could of course be a greater number of pre-stored weighting tables in order to adequately sample the range of likely scene lux values.

As shown in FIG. 6, the estimated scene lux level 159 (illustrated by the large asterisk on the plot) falls in between the levels for the pre-stored weighting tables corresponding to low-light 156 and mid-range 157 lighting conditions. Thus, an interpolated weighting table 153 may be generated via a suitable interpolation operation 152 (e.g., linear or logarithmic interpolation) in order to create an interpolated weighting table 153 that is more appropriate for the current scene having estimated scene lux level 159. In this embodiment, the image pixel data histogram 116 may then be applied to, e.g., multiplied with, the values in the newly-generated interpolated weighting table 153 in order to create a set of noise-weighted image pixel data, e.g., noise-optimized image pixel data histogram 154, This noise-optimized image pixel data histogram 154 may then be utilized by a desired AWB algorithm to calculate a more accurate scene white point.

It should be noted that the indexing and use of multiple optimized white pixel selection and weighting criteria to improve AWB performance is not limited to being based on estimated image noise levels, it could be based on any physical or numerical quality that correlates to the noise property of the image, e.g., scene lux, sensor analog gain, etc.

It should also be noted that the interpolation method used to calculate the weighting criteria for a noise level that is not stored can be carried out through linear Interpolation or any other appropriate non-linear interpolation method.

It should also be noted that the noise model that has been described herein is illustrative and exemplary. Any appropriate noise model with sound engineering basis could be used for modeling purposes.

Figure 7:
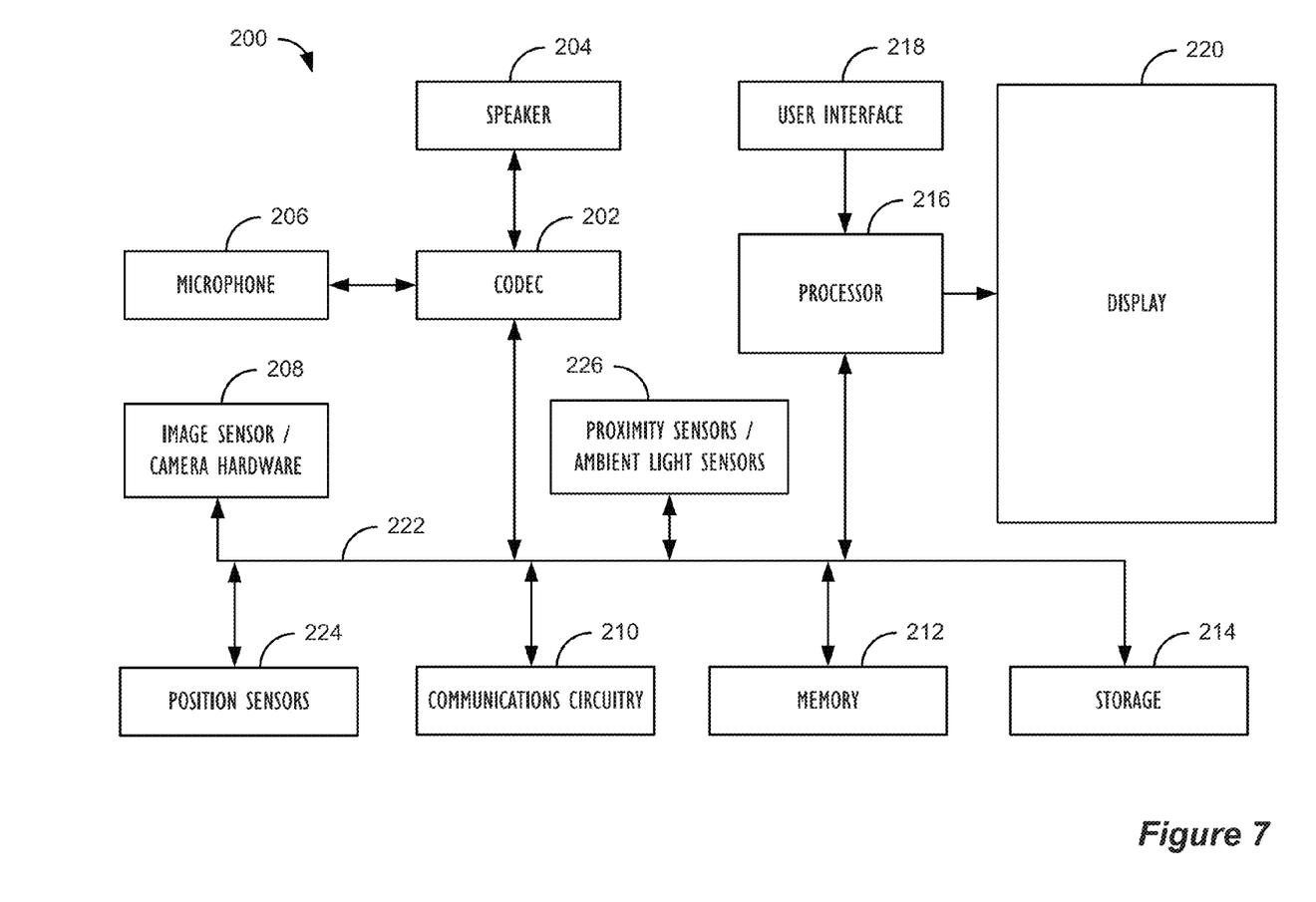
FIG. 7 illustrates a simplified functional block diagram of a representative electronic device possessing a display and an image sensor.

Referring now to FIG. 7, a simplified functional block diagram of a representative electronic device possessing a display 200 according to an illustrative embodiment, e.g., electronic image capture device 200, is shown. The electronic device 200 may include a processor 216, display 220, proximity sensor/ambient light sensor 226, microphone 206, audio/video codecs 202, speaker 204, communications circuitry 210, position sensors 224 (e.g., accelerometers or gyrometers), image sensor with associated camera hardware 208, user interface 218, memory 212, storage device 214, and communications bus 222. Processor 216 may be any suitable programmable control device and may control the operation of many functions, such as the generation and/or processing of image data, as well as other functions performed by electronic device 200. Processor 216 may drive display 220 and may receive user inputs from the user interface 218. An embedded processor provides a versatile and robust programmable control device that may be utilized for carrying out the disclosed techniques.

Storage device 211 may store media (e.g., image and video files), software (e.g., for implementing various functions on device 200), preference information, device profile information, and any other suitable data. Storage device 214 may include one more storage mediums for tangibly recording image data and program instructions, including for example, a hard-drive, permanent memory such as ROM, semi-permanent memory such as RAM, or cache. Program instructions may comprise a software implementation encoded in any desired language (e.g., C or C++) and organized into one or more program modules.

Memory 212 may include one or more different types of memory which may be used for performing device functions. For example, memory 212 may include cache, ROM, and/or RAM. Communications bus 222 may provide a data transfer path for transferring data to, from, or between at least storage device 214, memory 212, and processor 216. User interface 218 may allow a user to interact with the electronic device 200. For example, the user input device 218 can take a variety of forms, such as a button, keypad, dial, a click wheel, or a touch screen.

In one embodiment, the personal electronic device 200 may be an electronic device capable of processing and displaying media, such as image and video files. For example, the personal electronic device 200 may be a device such as such a mobile phone, personal data assistant (PDA), portable music player, monitor, television, laptop, desktop, and tablet computer, or other suitable personal device.

The foregoing description of preferred and other embodiments is not intended to limit or restrict the scope or applicability of the inventive concepts conceived of by the Applicants. As one example, although the present disclosure focused on handheld personal electronic image capture devices, it will be appreciated that the teachings of the present disclosure can be applied to other implementations, such as traditional digital cameras. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A non-transitory program storage device, readable by a programmable control device comprising instructions stored thereon for causing the programmable control device to:
   store image pixel data in a memory, wherein the image pixel data is obtained from an image captured by an image sensor;
   transform the image pixel data into a set of image pixel values over a color space;
   estimate a noise level for the image;
   identify, based at least in part on the estimated noise level, a noise-optimized weighting table of values, wherein each value in the noise-optimized weighting table has a corresponding image pixel value;
   multiply each image pixel value with its corresponding noise-optimized weighting table value to generate noise-weighted image pixel data;
   store the noise-weighted image pixel data in the memory; and
   calculate a scene white point for the image pixel data in the color space based, at least in part, on the noise-weighted image pixel data.

2. The non-transitory program storage device of claim 1, further comprising instructions for causing the programmable control device to use the calculated scene white point to color balance the image pixel data.

3. The non-transitory program storage device of claim 1, wherein the instructions for causing the programmable control device to estimate a noise level for the image comprise instructions for causing the programmable control device to estimate a lux level for the image.

4. The non-transitory program storage device of claim 1, wherein the instructions for causing the programmable control device to estimate a noise level for the image comprise instructions for causing the programmable control device to determine an analog gain of the image sensor.

5. The non-transitory program storage device of claim 1, wherein the instructions for causing the programmable control device to identify the noise-optimized weighting table of values comprise instructions for causing the programmable control device to interpolate between corresponding values in a plurality of pre-stored noise-optimized weighting tables.

6. The non-transitory program storage device of claim 5, wherein the instructions for causing the programmable control device to interpolate between corresponding values in a plurality of pre-stored noise-optimized weighting tables comprise instructions for causing the programmable control device to perform a linear or non-linear interpolation between corresponding values in two of the plurality of pre-stored noise-optimized weighting tables.

7. The non-transitory program storage device of claim 5, wherein each of the plurality of pre-stored noise-optimized weighting tables corresponds to a noise level.

8. The non-transitory program storage device of claim 5, wherein each of the plurality of pre-stored noise-optimized weighting tables corresponds to a lux level.

9. An apparatus comprising:
   an image sensor;
   a programmable control device;
   a memory coupled to the programmable control device and the image sensor, wherein instructions are stored in the memory, the instructions for causing the programmable control device to:
   obtain image pixel data from an image captured by the image sensor;

estimate a noise property of the image;
identify, based at least in part on the estimated noise property, a noise-optimized weighting table;
apply the noise-optimized weighting table to the image pixel data to generate noise-weighted image pixel data; and
send the noise-weighted image pixel data to an auto white balance (AWB) program module.

10. The apparatus of claim 9, further comprising instructions for causing the programmable control device to calculate a white point for the image pixel data.

11. The apparatus of claim 10, wherein the instructions for causing the programmable control device to calculate a white point further comprise instructions for causing the programmable control device to use the noise-weighted image pixel data.

12. The apparatus of claim 11, further comprising instructions for causing the programmable control device to color balance the image pixel data according to the calculated white point.

13. The apparatus of claim 9, wherein the instructions for causing the programmable control device to identify the noise-optimized weighting table comprise instructions for causing the programmable control device to interpolate between corresponding values in a plurality of noise-optimized weighting tables pre-stored in the memory.

14. The apparatus of claim 13, wherein each of the plurality of pre-stored noise-optimized weighting tables corresponds to a noise level.

15. A non-transitory program storage device, readable by a programmable control device comprising instructions stored thereon for causing the programmable control device to:
store image pixel data in a memory, wherein the image pixel data is obtained from an image captured by an image sensor;
estimate a noise property of the image;
identify, based at least in part on the estimated noise property, a noise-optimized pixel selection criterion;
apply the noise-optimized pixel selection criteria to the image pixel data to generate weighted image pixel data;
store the weighted image pixel data in the memory; and
calculate a scene white point.

16. The non-transitory program storage device of claim 15, wherein the instructions for causing the programmable control device to calculate the scene white point further comprise instructions for causing the programmable control device to use the weighted image pixel data.

17. The non-transitory program storage device of claim 15, wherein the instructions for causing the programmable control device to identify the noise-optimized pixel selection criteria comprise instructions for causing the programmable control device to interpolate between corresponding values in a plurality of pre-stored noise-optimized weighting tables.

18. The non-transitory program storage device of claim 17, wherein each of the plurality of pre-stored noise-optimized weighting tables corresponds to a noise level.

19. The non-transitory program storage device of claim 15, wherein the instructions for causing the programmable control device to identify the noise-optimized pixel selection criteria comprise instructions for causing the programmable control device to identify a binary selection criterion.

20. A non-transitory program storage device, readable by a programmable control device comprising instructions stored thereon for causing the programmable control device to:
store image pixel data in a memory, wherein the image pixel data is obtained from an image captured by an image sensor;
estimate a lux level of the image;
identify, based at least in part on the estimated lux level, a noise-optimized weighting table by interpolating between corresponding values in a plurality of pre-stored noise-optimized weighting tables;
apply the noise-optimized weighting table to the image pixel data to generate noise-weighted image pixel data; and
use the noise-weighted image pixel data to calculate a white point for the image pixel data.

21. The non-transitory program storage device of claim 20, wherein the instructions for causing the programmable control device to interpolate further comprise instructions for causing the programmable control device to perform a linear or non-linear interpolation calculation between corresponding values in two of the plurality of pre-stored noise-optimized weighting tables.

22. The non-transitory program storage device of claim 20, wherein each of the plurality of pre-stored noise-optimized weighting tables corresponds to a lux level.

* * * * *